(12) United States Patent
Shi et al.

(10) Patent No.: US 6,782,169 B2
(45) Date of Patent: Aug. 24, 2004

(54) SYSTEM FOR EFFICIENT COUPLING TO PHOTONIC CRYSTAL WAVEGUIDES

(75) Inventors: Shouyun Shi, Newark, DE (US); Caihua Chen, Newark, DE (US); Ahmed Sharkawy, Newark, DE (US); Dennis W. Prather, Landenberg, PA (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 10/139,991

(22) Filed: May 6, 2002

(65) Prior Publication Data

US 2003/0048993 A1 Mar. 13, 2003

Related U.S. Application Data

(60) Provisional application No. 60/317,413, filed on Sep. 5, 2001.

(51) Int. Cl.[7] .................................................. G02B 6/13
(52) U.S. Cl. .............................. 385/50; 385/14; 385/39
(58) Field of Search ............................ 385/14, 15, 27, 385/39, 33–35, 50

(56) References Cited

U.S. PATENT DOCUMENTS

| | | | |
|---|---|---|---|
| 5,970,191 A | | 10/1999 | Oba et al. |
| 6,088,496 A | | 7/2000 | Asghari |
| 6,134,369 A | * | 10/2000 | Kurosawa .................... 385/132 |
| 6,175,671 B1 | | 1/2001 | Roberts |
| 6,240,232 B1 | * | 5/2001 | Schneider et al. ........... 385/129 |
| 6,310,991 B1 | * | 10/2001 | Koops et al. ................... 385/14 |
| 6,381,389 B1 | * | 4/2002 | Kosaka .......................... 385/39 |
| 2003/0011775 A1 | | 1/2003 | Soljacic et al. |

FOREIGN PATENT DOCUMENTS

WO          WO 98/53350          11/1998

OTHER PUBLICATIONS

E. Yablonovitch, "Inhibited Spontaneous Emission in Solid–State Physics and Electronics," *Physical Review Letters*, vol. 58, No. 20, pp. 2059–2062 (May 1987).

S. John, "Strong Localization of Photons in Certain Disordered Dielectric Superlattices," *Physical Review Letters*, vol. 58, No. 23, pp. 2486–2489 (Jun. 1987).

K. M. Leung et al., "Photon band structures: The plane–wave method," *Physical Review B*, vol. 41, No. 14, pp. 10188–10190 (May 1990).

E. Yablonovitch et al., "Donor and Acceptor Modes in Photonic Band Structure," *Physical Review Letters*, vol. 67, No. 24, pp. 3380–3383 (Dec. 1991).

R.D. Meade et al., "Novel applications of photonic band gap materials: Low–loss bends and high Q cavities," *J. Appl. Phys.*, vol. 75, pp. 4753–4755 (May 1994).

J.D. Joannopoulos et al., *Photonics Crystals* (1995).

J. Rarity et al., "Microcavities and Photonic Bandgaps," *Physics and Applications*, vol. 324 (1995).

P. R. Villeneuve et al., "Microcavities in photonic crystals: Mode symmetry, tunability, and coupling efficiency," *Physical Review B*, vol. 54, No. 11, pp. 7837–7842 (Sep. 1996).

(List continued on next page.)

*Primary Examiner*—Hemang Sanghavi
*Assistant Examiner*—Scott Alan Knauss
(74) *Attorney, Agent, or Firm*—Connolly Bove Lodge & Hutz LLP

(57) ABSTRACT

In an optical coupling system, an optical coupler having a dielectric mirror or Gaussian beam mirror is used to efficiently couple optical signals to photonic crystal waveguides. Dielectric mirrors offer the advantage of optical coupling between dielectric waveguides and single mode photonic crystal waveguides. Various types of optical couplers may be implemented with or without a dielectric waveguide in the system.

25 Claims, 5 Drawing Sheets

OTHER PUBLICATIONS

J. Knight et al., "All-silica single-mode optical fiber with photonic crystal cladding," *Optics Letters*, vol. 21, No. 19, pp. 1547–1549 (Oct. 1996).

A. Mekis et al., "High Transmission through Sharp Bends in Photonic Crystal Waveguides," *Physical Review Letters*, vol. 77, No. 18, pp. 3787–3790 (Oct. 1996).

S. Fan et al., "Channel drop filters in photonic crystals," *Optics Express*, vol. 3, No. 1, pp. 4–11 (1998).

A. Scherer et al., "InGaAsP photonic band gap crystal membrane microsonators," *J. Vac. Sci. Tech. B*, vol. 16, pp. 3906–3910 (1998).

B.D'Urso et al., "Modal reflectivity in finite-depth two-dimensional photonic–crystal microcavities," *J. Opt. Soc. Am. B*, vol. 15, No. 3, pp. 1155–1159 (Mar. 1998).

S.G. Johnson et al., "Elimination of cross talk in waveguide intersections," *Optics Letters*, vol. 23, No. 23, pp. 1855–1857 (Dec. 1998).

L. Liu et al., "Photonic band structure in the nearly plane wave approximation," *Eur. Phys. J. B*, vol. 9, pp. 381–388 (1999).

O. Painter et al., "Defect modes of a two-dimensional photonic crystal in an optically thin dielectric slab," *J. Opt. Soc. Am. B.*, vol. 16, No. 2, pp. 275–285 (Feb. 1999).

S.G. Johnson et al., "Guided modes in photonic crystal slabs," *Physical Review B*, vol. 60, No. 8, pp. 5751–5758 (Aug. 1999).

R.F. Cregan et al., "Single-Mode Photonic Band Gap Guidance of Light in Air," *Science*, vol. 285, pp. 1537–1539 (Sep. 1999).

R. Stoffer et al., "Numerical studies of 2D photonic crystals: Waveguides, coupling between waveguides and filters," *Optical and Quantum Electronics*, vol. 32, pp. 947–961 (2000).

M. Tokushima et al., "Lightwave propagation through a 120° sharply bent single-line-defect photonic crystal waveguide," *Applied Physics Letters*, vol. 76, No. 8, pp. 952–954 (Feb. 2000).

M. Bayindir et al., "Propagation of photons by hopping: A waveguiding mechanism through localized coupled cavities in three-dimensional photonic crystals," *Physical Review B*, vol. 61, No. 18, pp. R1185–R11858 (May 2000).

A.R. McGurn, "Photonic crystal circuits: A theory for two- and three-dimensional networks," *Physical Review B*, vol. 61, No. 19, pp. 13235–13249 (May 2000).

T. Sondergaard et al., "Energy flow in photonic crystal waveguides," *Physical Review B*, vol. 61, No. 23, pp. 15688–15696 (Jun. 2000).

G. Parker et al., "Photonic Crystals," *Physics World*, vol. 13 (Aug. 2000).

B.J. Mangan et al., "Experimental study of dual-core photonic crystal fibre," *Electronics Letters*, vol. 36, No. 16, pp. 1358–1359 (Aug. 2000).

S.G. Johnson et al., "Linear waveguides in photonic-crystal slabs," *Physical Review B*, vol. 62, No. 12, pp. 8212–8222 (Sep. 2000).

M. Loncar et al., "Design and Fabrication of Silicon Photonic Crystal Optical Waveguides," *J. Lightwave Tech.*, vol. 18, No. 10, pp. 1402–1411 (Oct. 2000).

A. Adibi et al., "Properties of the Slab Modes in Photonic Crystal Optical Waveguides," *J. Lightwave Tech.*, vol. 18, No. 11, pp. 1554–1564 (Nov. 2000).

M. Bayindir et al., "Photonic-crystal-based beam splitters," *Applied Physics Letters*, vol. 77, No. 24, pp. 3902–3904 (Dec. 2000).

D. Hermann et al., "Photonic band structure computations," *Optics Express*, vol. 8, No. 3, pp. 167–172 (Jan. 2001).

S. Fan et al., "Waveguide branches in photonic crystals," *J. Opt. Soc. Am. B*, vol. 18, No. 2, pp. 162–165 (Feb. 2001).

E. Chow et al., "Quantitative analysis of bending efficiency in photonic-crystal waveguide bends at $\lambda$ 1.55 $\mu$m wavelengths," *Optics Letters*, vol. 26, No. 5, pp. 286–288 (Mar. 2001).

A. Sharkawy et al., "Multichannel wavelength division multiplexing with photonic crystals," *Applied Optics*, vol. 40, No. 14, pp. 2247–2252 (May 2001).

S.G. Johnson et al., "Multipole-cancellation mechanism for high-Q cavities in the absence of a complete photonic band gap," *Applied Physics Letters*, vol. 78, No. 22, 3388–3390 (May 2001).

\* cited by examiner

SYSTEM FOR EFFICIENT COUPLING TO PHOTONIC CRYSTAL WAVEGUIDES

CLAIM FOR PRIORITY

The present application claims priority of U.S. Provisional Patent Application Serial No. 60/317,413, filed Sep. 5, 2001, the entire disclosure of which is herein incorporated by reference in its entirety.

BACKGROUND OF THE INVENTION

A. Field of the Invention

The present invention relates generally to photonic crystals, and, more particularly to a system for efficient coupling to photonic crystal waveguides.

B. Description of the Related Art

During the last decade photonic crystals (also known as photonic band gap or PBG materials) have risen from a relatively obscure technology to a prominent field of research. In large part this is due to their unique ability to control, or redirect, the propagation of light. E. Yablonovich, "Inhibited spontaneous emission in solid-state physics and electronics," *Physical Review Letters*, vol. 58, pp. 2059–2062 (May 1987), and S. John, "Strong localization of photons in certain disordered dielectric superlattices," *Physical Review Letters*, vol. 58, pp. 2486–2489 (Jun. 1987), initially proposed the idea that a periodic dielectric structure can possess the property of a band gap for certain frequencies in the electromagnetic spectra, in much the same way as an electronic band gap exists in semiconductor materials. This property affords photonic crystals with a unique ability to guide and filter light as it propagates through it. In this way, photonic crystals have been used to improve the overall performance of many opto-electronic devices.

The concept of a photonic band gap material is as follows. In direct conceptual analogy to an electronic band gap in a semiconductor material, which excludes electrical carriers having stationary energy states within the band gap, a photonic band gap in a dielectric medium excludes stationary photonic energy states (i.e., electromagnetic radiation having some discrete wavelength or range of wavelengths) within a certain energy range or corresponding frequency range. In semiconductors, the electronic band gap results as a consequence of having a periodic atomic structure upon which the quantum mechanical behavior of the electrons in the material give rise to a forbidden range of energy levels, the so called electronic band gap. By analogy, the photonic band gap results if one has a periodically structured material, where the periodicity is of a distance suitable to interact with an electromagnetic wave of some characteristic wavelength, in such a way as to create a band of frequencies that are forbidden to exist within the material, the so called photonic band gap.

An envisioned use of these materials is the optical analog to semiconductor behavior, in which a photonic band gap material, or a plurality of such materials acting in concert, can be made to interact with and control light wave propagation in a manner analogous to the way that semiconductor materials can be made to interact with and control the flow of electrically charged particles, i.e., electricity, in both analog and digital electronic applications.

Planar photonic crystal circuits such as splitters, high Q-microcavities, and multi-channel drop/add filters have been investigated both theoretically and experimentally in both two- and three-dimensional photonic crystal structures. For two-dimensional photonic crystal structures, the photonic crystal consists of either an array of low index cylinders surrounded by a background material of sufficiently higher index or, an array of high index cylinders surrounded by a background material of sufficiently lower index. In both cases, in-plane confinement is achieved through multiple Bragg reflections that occur due to the presence of the material lattice, which represents the photonic crystal. For some three-dimensional photonic crystal structures, namely those that consist of a two-dimensional structure, or lattice, that are finite in height, confinement in the vertical direction is achieved through total internal reflection (TIR). In either case the main limiting factor in the wide spread use of these devices is the ability to get light into and out of these structures. For this reason, optical coupling structures have a pronounced impact on the operation of any photonic integrated circuit ("PIC").

There have been many types of coupling structures presented in the literature that include, among others, grating couplers and focusing grating couplers. These devices have been used to achieve coherent light coupling both into and out of a waveguide. Grating couplers have a periodicity in a single spatial direction, whereas focusing grating couplers (or grating lenses) have a curvilinear grating.

Unfortunately, coupling to photonic crystal structures has limited the true integration and implementation of photonic crystal integrated circuits. Photonic crystal waveguides have dimensions in sub-wavelength scale, which is favorable for device dimensions, but such small dimensions make efficient couple to photonic crystal structures exceedingly difficult.

While numerous attempts have been made to overcome the challenge of photonic crystal coupling, including tapered couplers, but coupling, coupled waveguides, and prism coupling, such attempts represent, more or less, variations of conventional techniques that have been used to couple optical signals to traditional dielectric waveguides. While these conventional techniques are also capable of coupling to photonic crystal waveguides, they do not provide highly efficient coupling to and from these waveguides, and they are highly susceptible to profile variations that are introduced during fabrication (e.g., errors introduced during the fabrication process). Such fabrication variations change and may completely diminish the coupling efficiency.

Thus, there is a need in the art for a coupling technique for photonic crystal structures that is not sensitive to fabrication variations, and is easy to fabricate and replicate using existing technology. Efficient coupling to and from photonic crystal circuits will open many new exciting opportunities in integrated optics and high-density optical interconnection, and provide true realization of a photonic crystal integrated circuit ("PCIC").

SUMMARY OF THE INVENTION

The present invention solves the problems of the related art by providing coupling to photonic crystal circuits using a reflective structure, such as a dielectric mirror, that efficiently couples an optical signal to and from photonic crystal waveguides.

As embodied and broadly described herein, the present invention is broadly drawn to an optical coupling system, comprising: a photonic crystal structure having one or more waveguides provided therein; a dielectric waveguide through which an optical signal is provided; and an optical coupler having a mirror, the optical coupler optically couple the optical signal from said dielectric waveguide to the one or more waveguides provided in said photonic crystal structure.

As further embodied and broadly described herein, the present invention is drawn broadly to a method of forming an optical coupling system, comprising: forming a photonic crystal structure having one or more waveguides provided therein, the photonic crystal structure being formed on a substrate; providing an optical signal source; and forming an optical coupler having a mirror on the substrate, the optical coupler optically couple an optical signal from the optical signal source to the one or more waveguides provided in the photonic crystal structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF EMBODIMENTS OF THE PRESENT INVENTION

Figure 1:
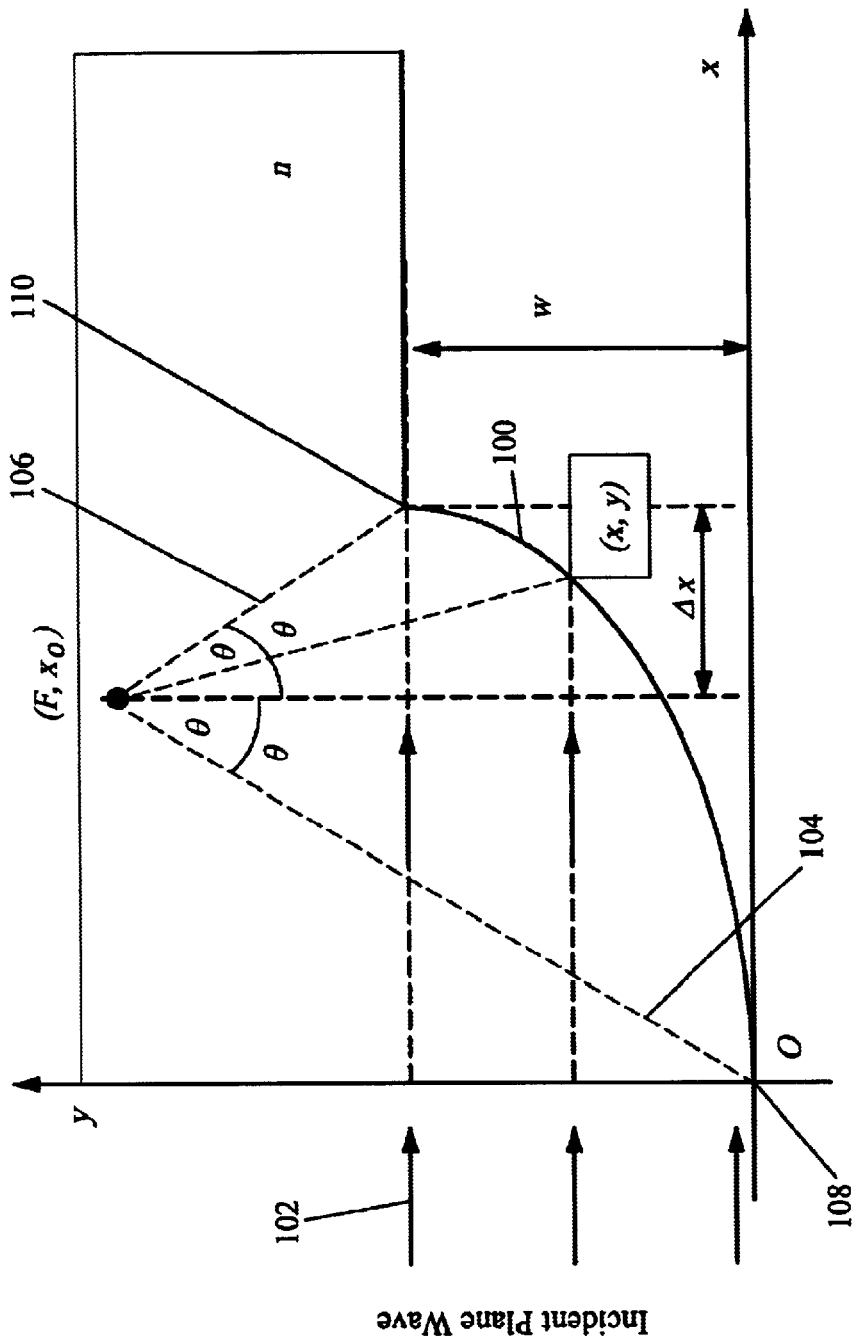
FIG. 1 is a graph showing how an optical coupler (with a dielectric mirror) in accordance with an embodiment of the present invention directs incident plane wave optical signals.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention is broadly drawn to a photonic crystal coupler that provides coupling with loose alignment requirements and high coupling efficiency. The photonic crystal coupler of the present invention may use a traditional dielectric waveguide or an optical fiber as the input and/or output interfaces for coupling optical signals to and from a photonic crystal device. Specifically, the coupler of the present invention is an optical coupler that efficiently couples an optical signal to and from photonic crystal waveguides.

A. Photonic Crystal Waveguides

Introduction of line defects into a photonic crystal lattice permits an electromagnetic wave having a frequency within the bandgap of the structure to be guided through the photonic crystal. The line defects resemble waveguides, and may be formed by either adding or removing dielectric material to a certain row or column along one of the directions of the photonic crystal lattice. Thus, photonic crystal waveguides can be used as an optical "wire" to guide an optical signal between different points, or devices, within an optical integrated circuit.

Since they are easier to simulate, two-dimensional photonic crystal waveguides were first analyzed. In a two-dimensional photonic crystal, the structure is assumed to be infinite in the dimension perpendicular to the plane of periodicity. Despite the fact that a two-dimensional photonic crystal structure can provide a starting point for the frequency ranges and design parameters used in a complete three-dimensional photonic crystal structure, there is an inherent approximation made by using a two-dimensional photonic crystal. Leakage of the electromagnetic waves radiating out of the line defect due to the finite height of a three-dimensional photonic crystal structure creates problems. Nevertheless two-dimensional analysis methods represent a good initial design approach for a photonic crystal structure and are therefore discussed below.

Most often, two-dimensional photonic crystal structures are analyzed using a plane wave expansion method, as set forth in J. D. Joannopoulos et al., *Photonic Crystals* (1995), and K. M. Leung et al., "Photon Band Structures: The Plane-Wave Method," *Physical Review B*, vol. 41, pp. 10188–10190 (1990), the disclosure of which is herein incorporated by reference in its entirety except where inconsistent with the teachings of the present invention, in order to define the location and the size of the photonic bandgap. Another approach widely used to calculate both the transmission spectra and field distribution is based on a numerical solution of Maxwell equations using the finite-difference time-domain ("FDTD") method, as set forth in D. Hermann et al., "Photonic Band Structure Computations," *Optics Express*, vol. 8, pp. 167–172 (2001), the disclosure of which is herein incorporated by reference in its entirety except where inconsistent with the teachings of the present invention. In particular, the FDTD method has been used to analyze multi-channel drop/add filters (see A. Sharkawy et al., "Multichannel Wavelength Division Multiplexing Using Photonic Crystals," *Applied Optics*, vol. 40, pp. 2247–2252 (2001), the disclosure of which is herein incorporated by reference in its entirety except where inconsistent with the teachings of the present invention), to calculate transmission through sharp bends (see A. Mekis et al., "High Transmission Through Sharp Bends In Photonic Crystal Waveguides," *Physical Review Letters*, vol. 77, pp. 3787–3790 (1996), the disclosure of which is herein incorporated by reference in its entirety except where inconsistent with the teachings of the present invention), and to study the waveguiding mechanism through localized coupled cavities in three-dimensional photonic crystals (see M. Bayindir et al., "Propagation of Photons by Hopping: A Waveguiding Mechanism Through Localized Coupled Cavities in Three-Dimensional Photonic Crystals," *Physical Review B*, vol. 61, pp. R11855–R11858 (2000), the disclosure of which is herein incorporated by reference in its entirety except where inconsistent with the teachings of the present invention).

For calculations of band diagrams, the present invention uses a two-dimensional FDTD method with periodic boundary conditions in the lateral directions (so as to make the structure look infinite in these directions) and absorbing, or perfectly matched layer, boundary conditions in the vertical direction.

With a plane wave modulated with a Gaussian envelope function incident on the photonic crystal structure, the transmission spectra may be found by placing a detector at the far end of the structure and taking the Fourier transform of the time-dependant electric field, normalized to the Fourier transform of the incident pulse. Once the photonic crystal structure has been analyzed in this way, the next step is to engineer it as a waveguide. As mentioned above, a waveguide can be created in a photonic crystal by introducing a line defect, which basically corresponds to either decreasing or increasing the dielectric constant of a certain row or column by varying the radius of the rods of this row or column. Preferably, however, a line defect is introduced into the photonic crystal by decreasing the radius of a certain row so that the row no longer exists. This creates a waveguide having a width $W_{grect}$ of:

$$W_{grect} = (\Omega+1)\alpha - 2r \tag{1}$$

where $\Omega$ is the number of rows or columns where the line defect will be created, $\alpha$ is the lattice constant (spacing between cylinders), and r is the radius of the cylinders from which the photonic crystal was created. The width of the line defect waveguide is proportional to the number of guided modes for a certain wave vector, as set forth in L. Liu et al., "Photonic Band Structure in the Nearly Plane Wave Approximation," *European Physical Journal B*, vol. 9, pp. 381–388 (1999), the disclosures of which are herein incorporated by reference in their entirety except where inconsistent with the teachings of the present invention. Field patterns for every eigenmode as well as energy flow can be also calculated using FDTD on the two-dimensional structure presented herein, as set forth in T. Sondergaard et al., "Energy Flow In Photonic Crystal Waveguides," *Physical Review B*, vol. 61, pp. 15688–15696 (2000), the disclosure of which is herein incorporated by reference in its entirety except where inconsistent with the teachings of the present invention.

Waveguides can also be created on a two-dimensional triangular lattice photonic crystal of air holes in silicon (Si) background, for which TE (electric field in plane) modes can be guided through a line defect. In such a structure, the line defect is created in the crystal by increasing the dielectric constant of the line defect, as opposed to decreasing the dielectric constant of the line defect for the two-dimensional rectangular lattice structure that was used to guide TM (magnetic field in plane) waves. For the triangular lattice the waveguide width $W_{gtri}$ can be calculated using:

$$W_{gtri} = (\Omega+1)\frac{\sqrt{3}}{2}a - 2r \tag{2}$$

For the case of a perforated dielectric slab, elimination of a single row or column will not be sufficient to have a single mode of propagation through the line defect. Thus, further design considerations must be taken into account to achieve that goal, as set forth in the disclosures of which are herein incorporated by reference in their entirety except where inconsistent with the teachings of the present invention.

B. Optical Coupler

After formation of the photonic crystal waveguides, the optical coupler needs to be formed. The optical coupler of the present invention includes a reflecting structure, or mirror, as its primary component. Since photonic crystal waveguides tend to consist of straight segments, optimal coupling between an optical signal (beam) and the photonic crystal waveguides is provided by a reflecting surface that both focuses and directs the optical beam in a direction that aligns to the direction of the waveguide. As such, the dielectric mirror should be designed according to the type of incident wave and the direction of the waveguide into which the beam is being coupled. Thus, the mirror may be designed according to various incident fields, such as plane wave, Gaussian beam illumination, etc. The design of such a mirror surface can be done in a general fashion, and then particular geometric configurations that optimize its use can be applied. Accordingly, the general design of the reflecting structure, or dielectric mirror, is presented first, and examples of specific coupling geometries are subsequently presented.

1. Mirror Design

The fundamental condition for the operation for the dielectric mirror 100 surface is that all of the possible optical paths (i.e., those emanating from the incident wave) travel the same distance to the desired focal spot (F, $x_0$), as shown in FIG. 1. By satisfying this condition one can ensure that the phase front of the incident beam constructively interferes at the focal spot. Consequently, for this to be true any arbitrary paths from the incident wave to the focal spot, according to FIG. 1, must be equal:

$$D_1 = x + D_2,$$

where $$D_1 = \sqrt{x_0^2 + F^2},$$

and $$D_2 = \sqrt{(x-x_0)^2 + (F-y)^2}.$$

Therefore, using geometry the condition for the mirror surface is:

$$x + \sqrt{(x-x_0)^2 + (F-y)^2} = \sqrt{x_0^2 + F^2}.$$

Solving for y we get:

$$y = F - \sqrt{\left(\sqrt{x_o^2 + F^2} - x\right)^2 - (x-x_o)^2}.$$

Thus, to determine the y coordinate of the mirror surface, one needs to simply define $x_o$, F, and the physical extent, or range, of x. While this equation satisfies the criterion of constructive interference at the focal spot, to maximize coupling efficiency the resultant beam should be propagating in the same direction as the photonic crystal channel, or waveguide. This can be satisfied for a wide range of waveguide directions. However, below only one waveguide is discussed and is oriented at a right angle to the waveguide incident on the mirror structure.

2. Right Angle Coupling Condition

If the incident wave is a plane wave 102 and the reflection coefficients at every point of the dielectric mirror 100 are the same, then, to direct the focused optical beam precisely in a right angle, or vertical direction, the two reflected rays 104, 106 on the extreme edge of the dielectric mirror 100 should have the same oblique angle (θ) to the vertical direction, as illustrated in FIG. 1. If the width of dielectric mirror 100 is fixed, the vertical coordinate of the focus for dielectric mirror 100 is designated as F, the horizontal coordinate of the focus F is designated $x_o$, the coordinates for an arbitrary point on dielectric mirror 100 are designated (x, y) and the horizontal distance between the focus and the upper edge is designated Δx, then from geometry we have:

$$\Delta x = \alpha x_0, \quad (3)$$

where α=(F−w)/F. According to geometrical optics, the optical path length of the two rays 104, 106 on the edge of the mirror 100 should be the same, thus:

$$x_0 + \Delta x + \sqrt{\Delta x^2 + (F-w)^2} = \sqrt{x_0^2 + F^2} \quad (4)$$

Substitution of Equation (3) into Equation (4) provides:

$$x_0 = \frac{(1-\alpha)F}{2}\sqrt{\frac{1}{\alpha}} = \frac{w}{2}\sqrt{\frac{F}{F-w}}. \quad (5)$$

Thus, when $x_0$ is defined according to Equation (5) one achieves maximum coupling efficiency from a large feed waveguide into a single mode channel. According to calculations the efficiency can be as high as 97%. In addition to direction of propagation, relative to the direction of the waveguide, another consideration is the profile of the incident field. The next section derives an expression for $x_o$ based upon an incident field profile that corresponds to a Gaussian shape.

3. Gaussian Beam Incident on the Mirror

Figure 2:
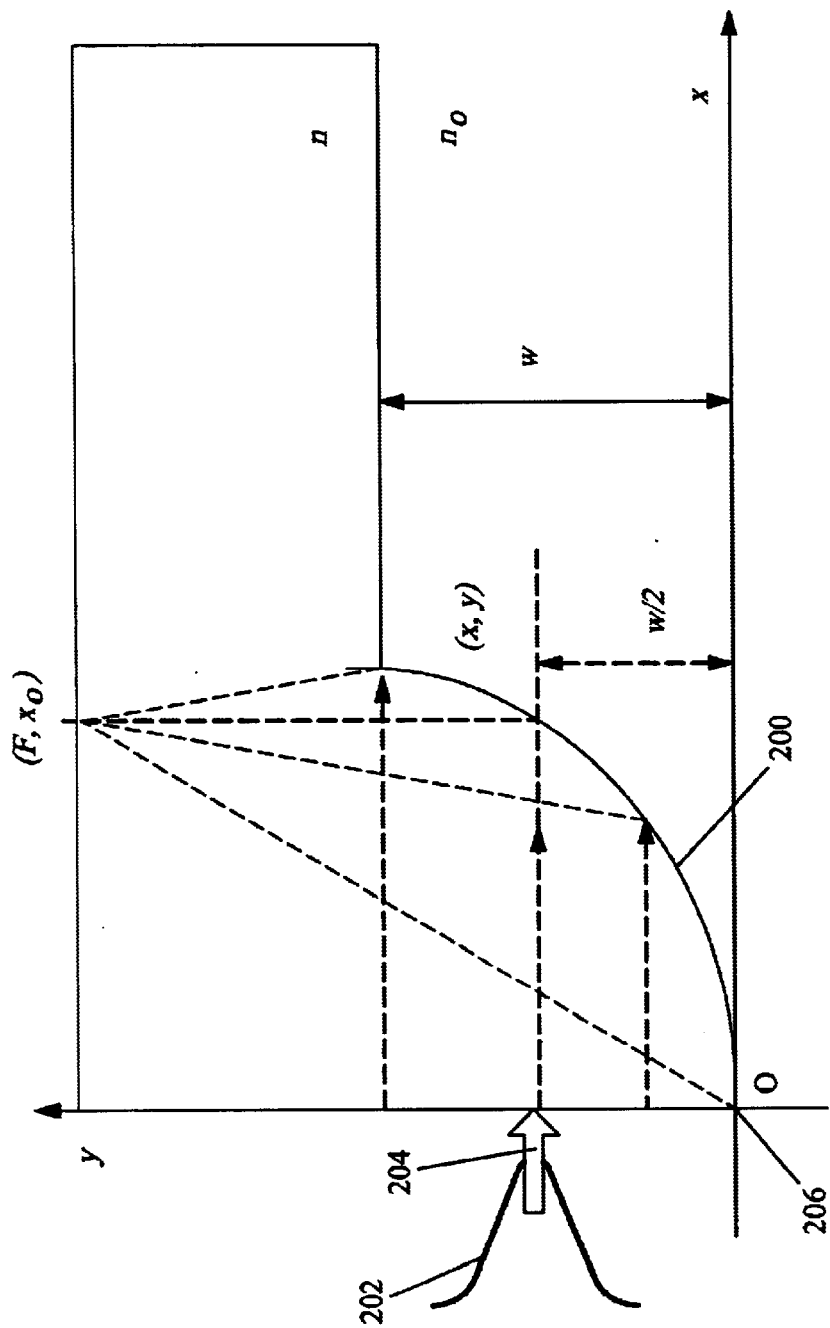
FIG. 2 is a graph showing how an optical coupler (with a dielectric mirror) in accordance with another embodiment of the present invention directs Gaussian incident wave optical signals.

If the wave incident on to a mirror 200 contains a Gaussian amplitude profile 202 with its corresponding highest energy at the center 204, then in order to direct the focused Gaussian beam 202 precisely in the vertical direction, the central ray 204 of the Gaussian beam 202 should be directed in exactly the vertical direction, as illustrated in FIG. 2. Accordingly, a condition on $x_0$ needs to be derived such that the reflecting surface of Gaussian beam mirror 200 acts in accordance with the profile of a Gaussian profile. To derive the condition for mirror 200, the width w of the Gaussian beam mirror 200 is fixed, the vertical coordinate of the focus for Gaussian beam mirror 200 is designated F, the horizontal coordinate of the focus is designated $x_o$, the coordinates for an arbitrary point on the mirror as (x, y), then the optical path length of the central ray 204 and the ray 206 incident on the bottom edge of the mirror should be identical. As such, $$x_0 + F - \frac{w}{2} = \sqrt{x_o^2 + F^2},$$

which can be rewritten as:

$$x_0 = \frac{Fw - w^2/4}{2(F - w/2)}. \quad (7)$$

Once an optical coupler and a photonic crystal waveguide have been designed, the next step is to combine them together and run a numerical experiment for the whole structure to enable calculation of the coupling efficiency. The following sections present a few exemplary implementations and numerical results for the optical coupler of the present invention, using various coupling schemes. It is intended that these examples be considered as exemplary only, with the true scope and spirit of the invention being indicated in the claims.

4. Optical Coupler with a Dielectric Waveguide

Figure 3:
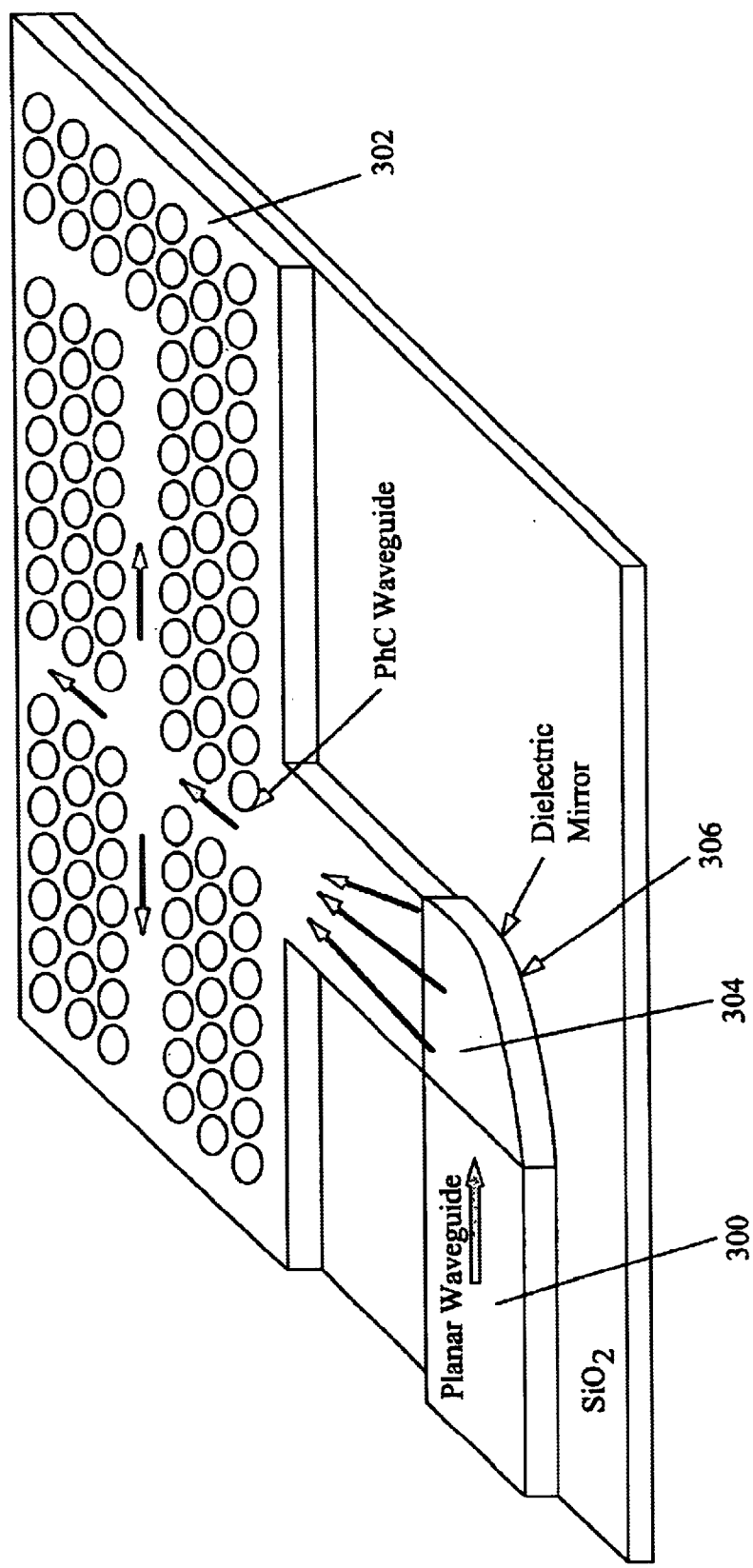
FIG. 3 is a perspective view showing how the optical coupler of FIG. 1 or FIG. 2 couples a dielectric waveguide to a photonic crystal waveguide.
Figure 4:
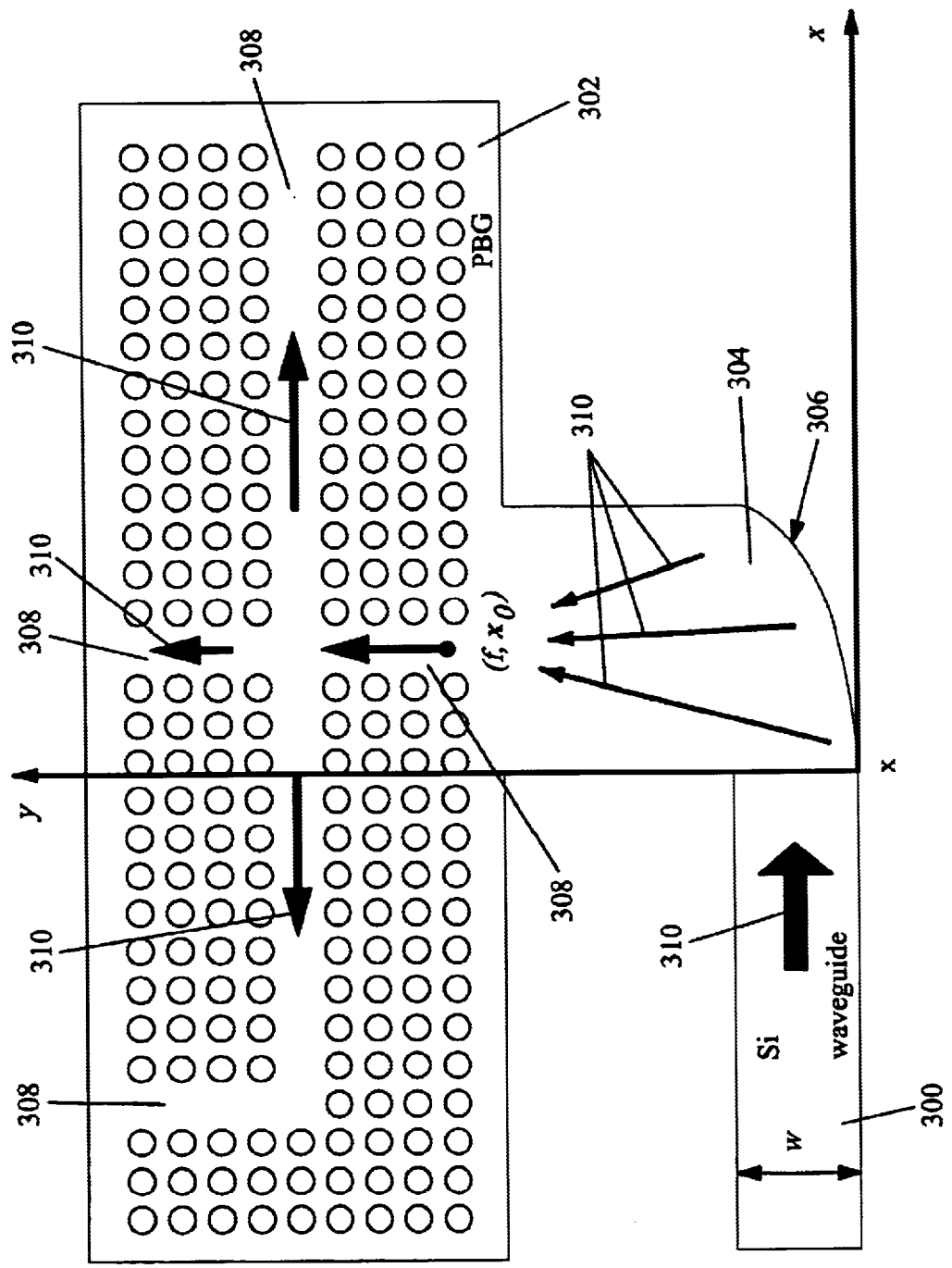
FIG. 4 is a top plan view of the optical coupler, dielectric waveguide, and photonic crystal waveguide arrangement shown in FIG. 3.

A first implementation combines a planar dielectric waveguide 300 and a photonic crystal structure 302 (as described above) with an optical coupler 304 having a dielectric mirror or Gaussian mirror 306, as shown and described in FIGS. 3 and 4.

Dielectric waveguide 300, photonic crystal structure 302, as well as micro resonators can be fabricated on silicon-on-insulator ("SOI") wafers, in which case the result is a planar slab that contains the optical structures. One such method of fabrication is to pattern optical structures in polymethyl-methacrylate (PMMA) using an electron beam lithography system, and then transferred that pattern into silicon using chemically assisted ion-beam etching ("CAIBE"), as set forth in M. Loncar et al., "Design and fabrication of silicon photonic crystal optical waveguides," *Journal Of Lightwave Technology*, vol. 18, pp. 1402–1411 (2000), the disclosure of which is herein incorporated by reference in its entirety except where inconsistent with the teachings of the present invention.

As shown in FIGS. 3 and 4, the coupling system consists of three main parts: planar dielectric waveguide 300, optical coupler 304 having a mirror 306, and a photonic crystal structure 302. The coupling system was designed to operate at a wavelength of λ=1.3 micrometers (μm), but may be scaled to any desirable wavelength. Photonic crystal structure 302 may have an index of refraction of $n_{wg}$=3.37, and mirror 306 may have a focus f that equals the width w of dielectric waveguide 300 which may be, for example, f=15 μm. Photonic crystal structure 302 may be engineered in a perforated slab of a triangular array of air holes of lattice constant α=0.46 μm, and radius r=0.185 μm. Such a photonic crystal structure has a bandgap for TE-polarized modes between λ=1.18 μm and λ=1.64 μm. Waveguides 308 may be created in photonic crystal structure 302 by introducing line defects each having a width $W_{photonic\ crystal}$=0.427 μm.

To calculate the coupling from dielectric waveguide 300 to photonic crystal structure 302 through mirror 306, a Gaussian-shaped pulse 310 was incident through dielectric waveguide 300. Results were obtained through a numerical experiment using the finite-difference time domain (FDTD) with perfectly matched layer as an absorbing boundary condition. The fundamental mode was excited at the input of dielectric waveguide 300, and the pulse 310 propagates through the dielectric waveguide 300. Since the pulse 310 is incident on the surface of the mirror 306 it comes to a focus point (F, $x_0$) at the input of the photonic crystal structure 302. The pulse 310 is then further guided within the photonic crystal structure 302 through waveguides 308 and multiple Bragg reflections, where it can be further processed or output at the far ends of photonic crystal structure 302. The coupling efficiency for the above structure was found to be 83%.

5. Optical Coupler without a Dielectric Waveguide

Figure 5:
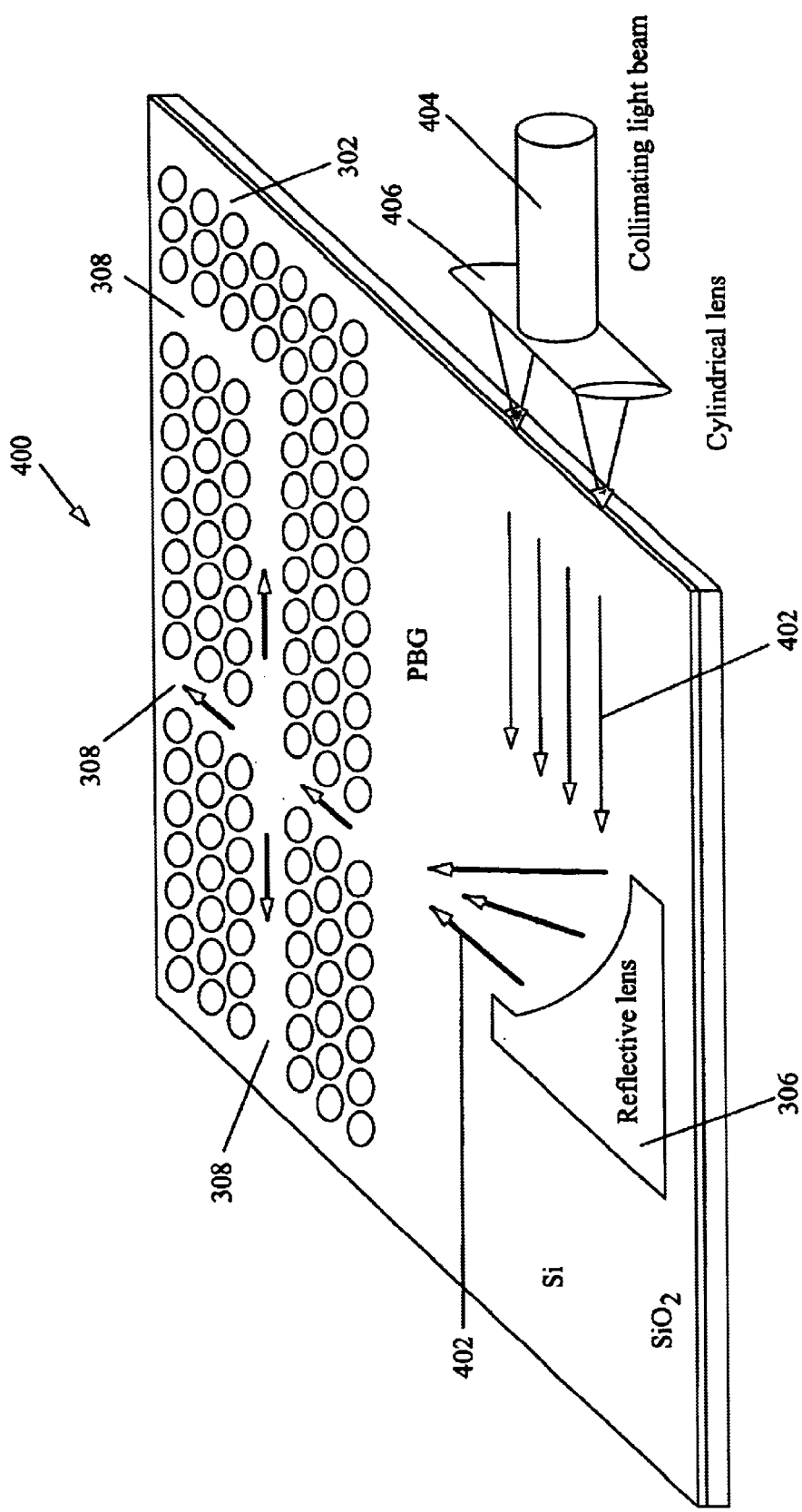
FIG. 5 is a perspective view showing how the optical coupler of FIG. 1 or FIG. 2 couples a light source to a photonic crystal waveguide.

As shown in FIG. 5, the dielectric waveguide 302 may be removed to simulate a guided plane wave coupling to photonic crystal structure 302, where a plane wave 402 provided by a collimating light beam 404 and a cylindrical lens 406 will see infinitely separated sidewalls. Such a structure 400 would include a similar photonic crystal structure 302 and mirror 306 as shown in FIGS. 3 and 4. Photonic crystal structure 302 may have a wavelength λ=1.3 μm, a lattice constant α=0.52 μm, a radius r=0.234 μm, a waveguide width $W_{photonic\ crystal}$=0.728 μm, and a high index (Si) slab thickness of 375 μm. The structure may also be analyzed using the finite-difference time domain (FDTD) with perfectly matched layer as an absorbing boundary condition. The coupling efficiency for structure 400 was found to be 94% for a single-guided mode coupling.

It will be apparent to those skilled in the art that various modifications and variations can be made in the coupling scheme of the present invention and in construction of this scheme without departing from the scope or spirit of the invention. As an example, the material selections and dimensions discussed above are purely exemplary and not limiting of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. An optical coupling system, comprising:
    a photonic crystal structure having one or more waveguides provided therein;
    a dielectric waveguide through which an optical signal is provided; and
    an optical coupler having mirror, the optical coupler optically coupling the optical signal from said dielectric waveguide to the one or more waveguides provided in said photonic crystal structure, wherein the mirror has a focal point substantially equal to a frequency of the optical signal.

2. An optical coupling system as recited in claim 1, wherein the mirror of said optical coupler is a dielectric mirror.

3. An optical coupling system as recited in claim 1, wherein the mirror of said optical coupler is a Gaussian beam mirror.

4. An optical coupling system as recited in claim 1, wherein said photonic crystal structure, said dielectric waveguide, and said optical coupler are fabricated in a silicon-on-insulator substrate.

5. An optical coupling system as recited in claim 1, wherein a width of each of the one or more waveguides of said photonic crystal structure is substantially equal to 1.4 micrometers.

6. An optical coupling system as recited in claim 1, wherein a coupling efficiency of the coupling system is greater than eighty percent.

7. An optical coupling system, comprising:
    a photonic crystal structure having one or more waveguides provided therein;
    an optical signal source for providing an optical signal; and
    an optical coupler having a mirror, the optical coupler optically coupling the optical signal from said optical signal source to the one or more waveguides provided in said photonic crystal structure, wherein the mirror has focal point substantially equal to a frequency of the optical signal.

8. An optical coupling system as recited in claim 7, wherein said optical signal source comprises a collimating light beam and a cylindrical lens.

9. An optical coupling system as recited in claim 7, wherein the mirror of said optical coupler is a dielectric mirror.

10. An optical coupling system as recited in claim 7, wherein the mirror of said optical coupler is a Gaussian beam mirror.

11. An optical coupling system as recited in claim 7, wherein said photonic crystal structure, said dielectric waveguide, and said optical coupler are fabricated in a silicon-on-insulator substrate.

12. An optical coupling system as recited in claim 7, wherein a width of each of the one or more waveguides of said photonic crystal structure is substantially equal to 0.728 micrometers.

13. An optical coupling system as recited in claim 7, wherein a coupling efficiency of the coupling system is greater than ninety percent.

14. A method of forming an optical coupling system, comprising:
    forming a photonic crystal structure having one or more waveguides provided therein, the photonic crystal structure being formed on a substrate;
    providing an optical signal source; and
    forming an optical coupler having a mirror on the substrate, the optical coupler optically coupling an optical signal from the optical signal source to the one or more waveguides provided in the photonic crystal structure, wherein the mirror has a focal point substantially equal to a frequency of the optical signal.

15. A method of forming an optical coupling system as recited in claim 14, wherein the optical signal source comprises a dielectric waveguide formed on the substrate.

16. A method of forming an optical coupling system as recited in claim 14, wherein the optical signal source comprises a collimating light beam and a cylindrical lens provided adjacent to the substrate.

17. A method of forming an optical coupling system as recited in claim 14, wherein the mirror of the optical coupler is dielectric mirror.

18. A method of forming an optical coupling system as recited in claim 14, wherein the mirror of the optical coupler is Gaussian beam mirror.

19. A method of forming an optical coupling system as recited in claim 14, wherein the substrate is a silicon-on-insulator substrate.

20. A method of forming an optical coupling system, comprising:
    forming a photonic crystal structure having one or more waveguides provided therein, the photonic crystal structure being formed on a substrate;
    forming a dielectric waveguide through which an optical signal is provided on the substrate; and
    forming an optical coupler having a mirror on the substrate, the optical coupler optically coupling the optical signal from the dielectric waveguide to the one or more waveguides provided in the photonic crystal structure, wherein in the mirror has a focal point substantially equal to a frequency of the optical signal.

21. A method of forming an optical coupling system as recited in claim 20, wherein the mirror of the optical coupler is a dielectric mirror.

22. A method of forming an optical coupling system as recited in claim 20, wherein the mirror of the optical coupler is a Gaussian beam mirror.

23. A method of forming an optical coupling system as recited in claim 20, wherein the substrate is a silicon-on-insulator substrate.

24. A method of forming an optical coupling system as recited in claim 20, wherein a width of each of the one or more waveguides of the photonic crystal structure is substantially equal to 1.4 micrometers.

25. A method of forming an optical coupling system as recited in claim 20, wherein a coupling efficiency of the coupling system is greater than eighty percent.

* * * * *